(12) United States Patent
Mu et al.

(10) Patent No.: US 11,971,882 B2
(45) Date of Patent: Apr. 30, 2024

(54) SYSTEM AND METHOD FOR BATCH AND REAL-TIME FEATURE COMPUTATION

(71) Applicant: THE FOURTH PARADIGM (BEIJING) TECH CO LTD, Beijing (CN)

(72) Inventors: Ni Mu, Beijing (CN); Taize Wang, Beijing (CN)

(73) Assignee: THE FOURTH PARADIGM (BEIJING) TECH CO LTD, Beijing (CN)

( * ) Notice: Subject to any disclaimer, the term of this patent is extended or adjusted under 35 U.S.C. 154(b) by 3 days.

(21) Appl. No.: 17/639,125

(22) PCT Filed: Aug. 26, 2020

(86) PCT No.: PCT/CN2020/111412
§ 371 (c)(1),
(2) Date: Feb. 28, 2022

(87) PCT Pub. No.: WO2021/037066
PCT Pub. Date: Mar. 4, 2021

(65) Prior Publication Data
US 2022/0292083 A1    Sep. 15, 2022

(30) Foreign Application Priority Data
Aug. 26, 2019 (CN) .......................... 201910789592.2

(51) Int. Cl.
*G06F 16/30* (2019.01)
*G06F 16/23* (2019.01)
(Continued)

(52) U.S. Cl.
CPC .......... *G06F 16/2386* (2019.01); *G06F 16/25* (2019.01); *G06F 16/27* (2019.01)

(58) Field of Classification Search
CPC ....... G06F 16/2386; G06F 16/27; G06F 16/25
See application file for complete search history.

(56) References Cited

U.S. PATENT DOCUMENTS

| 8,156,119 B2 | 4/2012 | Hu et al. |
| 10,387,798 B2 | 8/2019 | Duggan et al. |

(Continued)

FOREIGN PATENT DOCUMENTS

| CN | 105488662 A | 4/2016 |
| CN | 106469202 A | 3/2017 |

(Continued)

*Primary Examiner* — Khanh B Pham
(74) *Attorney, Agent, or Firm* — Bridgeway IP Law Group, PLLC; Sang Ho Lee; Hyun Woo Shin (57) ABSTRACT

The present disclosure discloses a system and method for batch and real-time feature computation, and the system includes: a management server, one or more batch feature computing units, one or more distributed computing units, one or more real-time feature computing units, an offline database and a real-time database. The management server receives a script containing feature computing logics, starts batch feature computation in a batch feature computing scenario, and deploys the script in a real-time feature computing scenario to generate a real-time computing plan, wherein the script containing the feature computing logics has unity for batch feature computing logics and real-time feature computing logics, and the real-time database obtains and stores data for the real-time feature computation from the offline database. According to the present disclosure, the batch feature computing logics and the real-time feature computing logics may be unified by the script.

14 Claims, 4 Drawing Sheets

(51) Int. Cl.
*G06F 16/25* (2019.01)
*G06F 16/27* (2019.01)

(56) References Cited

U.S. PATENT DOCUMENTS

| | | | |
|---|---|---|---|
| 2014/0289188 A1* | 9/2014 | Shimanovsky | G06F 16/2386 |
| | | | 707/609 |
| 2014/0297744 A1* | 10/2014 | Lazar | H04L 51/42 |
| | | | 709/204 |
| 2015/0278706 A1 | 10/2015 | Shivashankar et al. | |
| 2017/0076323 A1* | 3/2017 | Palanciuc | G06Q 30/0255 |
| 2018/0293463 A1 | 10/2018 | Brown | |
| 2019/0018426 A1* | 1/2019 | Yao | G05D 1/0212 |
| 2019/0146977 A1* | 5/2019 | Thomas | G06Q 10/10 |
| | | | 707/602 |

FOREIGN PATENT DOCUMENTS

| | | |
|---|---|---|
| CN | 108228861 A | 6/2018 |
| CN | 108519914 A | 9/2018 |
| CN | 109144648 A | 1/2019 |
| CN | 109597842 A | 4/2019 |
| CN | 109918048 A | 6/2019 |
| CN | 110502579 A | 11/2019 |

\* cited by examiner

SYSTEM AND METHOD FOR BATCH AND REAL-TIME FEATURE COMPUTATION

The present application claims priority of Chinese Patent Application No. 201910789592.2 filed on Aug. 26, 2019, with the title of "SYSTEM AND METHOD FOR BATCH AND REAL-TIME FEATURE COMPUTATION", wherein the disclosure of the above application is incorporated herein by references.

TECHNICAL FIELD

The present disclosure generally relates to a data processing field, and more particularly, relates to a system and method for batch and real-time feature computation.

BACKGROUND

With the advent of massive data, people tend to use machine learning techniques to mine value from data. Machine learning is an inevitable product of the development of artificial intelligence research to a certain stage. It is committed to improving the performance of the system itself using experience by means of computing. In computer systems, "experience" usually exists in a form of "data". "Models" may be generated from data through machine learning algorithms, that is to say, the experience data is provided to the machine learning algorithms, then the models may be generated based on these experience data. When faced with a new situation, the trained model is used to get corresponding prediction results.

Machine learning platforms or systems are produced based on such machine learning techniques. In a machine learning platform or system, whether it is a stage of training a machine learning model or a stage of using the machine learning model for prediction, feature computation needs to be performed, for example, machine learning samples including various features are obtained by performing feature extraction on the data.

In the existing machine learning platforms or systems, tasks for performing feature computation may include offline tasks and online tasks.

Offline tasks may be used for batch feature computation. For example, when a scheduled task is started, the feature computation of big data is executed in batches, and after all feature computations are completed, final execution results are obtained for subsequent research. Offline tasks may be aimed at time-insensitive business scenarios. For example, in a banking business scenario, offline tasks may include predicting whether each user will purchase wealth management products based on the consumption behavior data of a group of users in the previous six months.

Online tasks may be used for real-time feature computation. For example, feature computation may be performed on a certain amount of data in real time, and the obtained feature computation results may be used for prediction operations. Online tasks may be aimed at time-sensitive business scenarios, for example, in an online shopping business scenario, related products may be recommended based on the products recently browsed by users.

However, in the existing machine learning platforms or systems, the batch feature computing logics and the real-time feature computing logics are not unified, and the two are different or even conflict. In this case, two kinds of feature computing logics need to be set and maintained separately.

In addition, in the existing machine learning platforms or systems, offline database for batch feature processing and real-time database for real-time feature processing are separated. The data in the two databases is not associated, and the two databases need to be set separately and maintained separately.

SUMMARY

According to an exemplary embodiment of the present disclosure, a system for batch and real-time feature computation is provided, wherein the system includes: a management server receiving a script containing feature computing logics, in a batch feature computing scenario, selecting a batch feature computing unit for batch feature computation from batch feature computing units registered with the management server to start the batch feature computation, in a real-time feature computing scenario, deploying the script to real-time feature computing units registered with the management server to generate a real-time computing plan, and selecting a real-time feature computing unit used when executing the real-time computing plan from the real-time feature computing units registered with the management server, wherein the script containing the feature computing logics has unity for batch feature computing logics and real-time feature computing logics; one or more batch feature computing units, being registered with the management server when started, generating a batch computing task when selected to start batch feature computation, and transmitting the batch computing task to one or more distributed computing units; the one or more distributed computing units executing the batch computing task to perform the batch feature computation based on the script and data stored in an offline database; one or more real-time feature computing units, being registered with the management server when started, and performing real-time feature computation based on data stored in a real-time database and the script when selected to execute the real-time computing plan; the offline database storing the data for the batch feature computation; and the real-time database obtaining and storing the data for the real-time feature computation from the offline database.

According to another exemplary embodiment of the present disclosure, a method for batch and real-time feature computation is provided, wherein the method includes: receiving a script containing feature computing logics; in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database; and in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script containing the feature computing logics has unity for batch feature computing logics and real-time feature computing logics, and the data stored in the offline database is data for the batch feature computation; and the data stored in the real-time database is data for the real-time feature computation obtained from the offline database.

According to another exemplary embodiment of the present disclosure, a management server including at least one computing device and at least one storage device storing instructions is provided, wherein the instructions, when being run by the at least one computing device, cause the at least one computing device to execute the following steps of a method for batch and real-time feature computation:

receiving a script containing feature computing logics; in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database; and in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script containing the feature computing logics has unity for batch feature computing logics and real-time feature computing logics, and the data stored in the offline database is data for the batch feature computation; and the data stored in the real-time database is data for the real-time feature computation obtained from the offline database.

According to another exemplary embodiment of the present disclosure, a computer readable storage medium storing instructions is provided, wherein the instructions, when executed by at least one computing device, cause the at least one computing device to execute the method as described above.

Other aspects and advantages of the general concept of the present disclosure will be partially illustrated in the subsequent depictions, and the other part will become clear through the depiction or may be learned through the implementation of the general concept of the present disclosure.

BRIEF DESCRIPTION OF THE DRAWINGS

The above and other purposes and features of the exemplary embodiments of the present disclosure will become clearer through the following description for the exemplary embodiments taking in conjunction with the accompanying drawings in which.

DETAILED DESCRIPTION OF THE EMBODIMENTS

Reference will now be made in detail to embodiments of the disclosure, examples of which are illustrated in the accompanying drawings, wherein identical reference numerals refer to the identical parts. The embodiments will be described below by referring to the accompanying drawings in order to explain the disclosure. It should be noted here that "at least one of several items" appearing in the present disclosure all means including three parallel cases: "any one of the several items", "a combination of any multiple of the several items", and "the entirety of the several items". "And/or" appearing in the present disclosure indicates at least one of the two or more items connected by it. For example, "including at least one of A and B" and "including A and/or B" include the following three parallel cases: (1) including A; (2) including B; and (3) including A and B. For another example, "executing at least one of Step 1 and Step 2" and "executing Step 1 and/or Step 2" indicate the following three parallel cases: (1) executing Step 1; (2) executing Step 2; and (3) executing Step 1 and Step 2. That is to say, "A and/or B" may also be indicated as "at least one of A and B", and "executing Step 1 and/or Step 2" may also be indicated as "at least one of executing Step 1 and Step 2".

In order to resolve problems that in a machine learning scenario, the batch feature computation and the real-time feature computation are separated (for example, the batch feature computing logics and the real-time feature computing logics are not unified) and the offline database of the batch feature processing and the real-time database of the real-time feature processing are separated. Exemplary embodiments of the present disclosure may employ a unified script and two associated databases to simultaneously support the batch feature computation and the real-time feature computation. The script here may include a script written in a feature query language, etc., and may also include codes or a script written in various computer languages.

Figure 1:
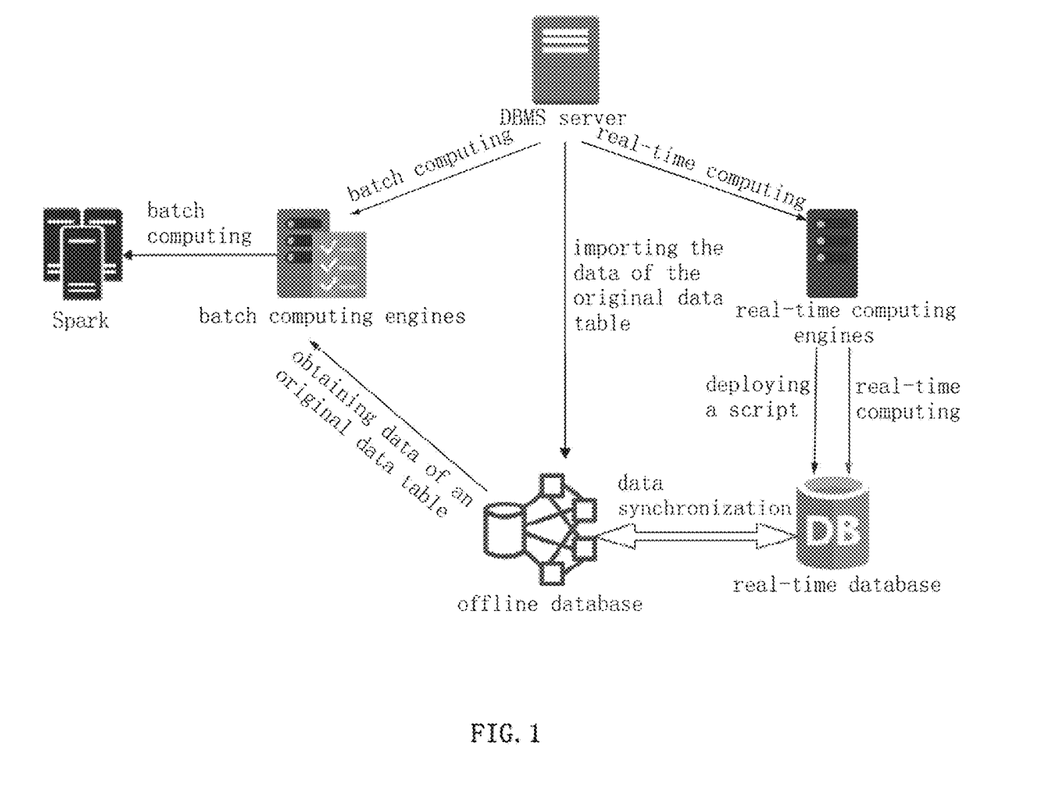
FIG. 1 illustrates a structural schematic diagram of a system for batch and real-time feature computation according to an exemplary embodiment of the present disclosure.

FIG. 1 illustrates a structural schematic diagram of a system for batch and real-time feature computation according to an exemplary embodiment of the present disclosure. The system for batch and real-time feature computation according to an exemplary embodiment of the present disclosure may include: a management server, one or more batch feature computing units, one or more distributed computing units, one or more real-time feature computing units, an offline database and a real-time database.

The management server may receive a script containing feature computing logics, in a batch feature computing scenario, select a batch feature computing unit for batch feature computation from batch feature computing units registered with the management server to start the batch feature computation, in a real-time feature computing scenario, deploy the script to real-time feature computing units registered with the management server to generate a real-time computing plan, and select a real-time feature computing unit used when executing the real-time computing plan from the real-time feature computing units registered with the management server, wherein the script containing the feature computing logics has unity for batch feature computing logics and real-time feature computing logics; the one or more batch feature computing units are registered with the management server when started, generate a batch computing task when selected to start the batch feature computation, and transmit the batch computing task to the one or more distributed computing units. The one or more distributed computing units execute the batch computing task to perform the batch feature computation based on the script and data stored in the offline database. The one or more real-time feature computing units are registered with the management server when started, and perform the real-time feature computation based on data stored in the real-time database and the script when selected to execute the real-time computing plan. The offline database may store the data for the batch feature computation (for example, all historical or raw data). The real-time database may obtain and store the data for the real-time feature computation from the offline database.

As an example, the management server may be implemented as a database management system (DBMS) server, etc. Through the management server, the user may view various desired results for the input script, such as batch feature computation results, real-time feature computation results, data field structures, syntax error verification results, intermediate running results and/or final results running results obtained through debugging, batch feature computation execution status, etc. In the batch feature computing scenario and in the real-time feature computing scenario, the user may input the unified script without using different scripts according to different computing scenarios. The management server may also be implemented as respective units and/or databases of the management system, so as to implement data importing operations and task scheduling, etc.

It should be noted here that the intermediate running results and/or the final running results may also be expressed as at least one of the intermediate running results and the final running results. The management server in the present disclosure may also be implemented as respective units and/or databases of the management system, and may also be expressed as: the management server in the present disclosure may also be implemented as at least one of respective units and databases of the management system.

As an example, the batch feature computing unit may be implemented as a batch computing engine (for example, Spark), the distributed computing unit may be implemented as a distributed computing cluster, the real-time feature computing unit may be implemented as a real-time computing engine, and the real-time database may be implemented as a memory database.

As an example, a selection of batch feature computing units, a selection of distributed computing units and/or a selection of real-time feature computing units may be implemented according to a load balancing goal. The batch computing task may be executed periodically or according to a corresponding trigger instruction. The real-time computing plan may be executed according to certain trigger conditions (for example, trigger conditions when data to be predicted (for example, sample data) is received online).

It should be noted here that the selection of batch feature computing units, the selection of distributed computing units and/or the selection of real-time feature computing units may be implemented according to the load balancing goal, and may also be expressed as: at least one of the selection of batch feature computing units, the selection of distributed computing units and the selection of real-time feature computing units may be implemented according to the load balancing goal.

As an example, the data in the offline database and the data in the real-time database are at least partially synchronized, wherein the real-time database and the offline database perform data synchronization according to a specific mechanism, for example, the real-time database and the offline database perform data synchronization based on data changes or based on a master-slave synchronization mechanism, periodically or in response to user triggering. Data synchronization may be performed based on log files, and the log files are directed to the real-time database and/or the offline database, and may record data changes in the corresponding databases. Through data synchronization, the consistency of the data in the batch feature computing scenario and the real-time feature computing scenario may be ensured, so that the same computation result may be obtained by using the same script and the data for the batch feature computation and the real-time feature computation.

It should be noted here that the real-time database and/or the offline database in the present disclosure may also be expressed as at least one of the real-time database and the offline database.

As an example, the real-time database is a memory database.

As an example, the management server further initializes the real-time database to obtain a data field structure (for example, schema) corresponding to the real-time feature computation.

As an example, the management server further receives raw data imported by a user and stores the raw data in the offline database as the data for the batch feature computation, or the management server further uses at least a part of the data pre-stored in the offline database as the data for the batch feature computation. In order to perform data import, an original table with a specific data field structure may be created under the specified namespace in the offline database. When the raw data is imported, the management server may receive a local file uploaded by the user to the management server from the local, and create the original table based on the local file. The input parameters of the data import include: a table name and a local file (the local file itself is uploaded to the management server as an input parameter), and the local file may be forwarded to and stored in the offline database by the management server. When the data pre-stored in the offline database is used as the data for the batch feature computation, it may be implemented based on a data storage path in the offline database. In this case, the input parameters may include: the table name and the storage path of the data pre-stored in the offline database.

As an example, the management server may also verify whether there is a syntax error in the script, and/or debug at least a part of intermediate running results and/or final running results corresponding to the script based on at least a part of the data. A verification result for the syntax error, intermediate running results and/or final running results may be fed back to the user, so that the user may timely change the script.

It should be noted here that the above content may also be expressed as: the management server is configured to perform at least one of verifying whether there is the syntax error in the script, debugging at least a part of intermediate running results corresponding to the script based on at least a part of the data, and debugging at least a part of final running results corresponding to the script based on at least a part of the data. At least one of the verification result for the syntax error, the intermediate running results and/or the final running results may be fed back to the user, so that the user may timely change the script.

Figure 2:
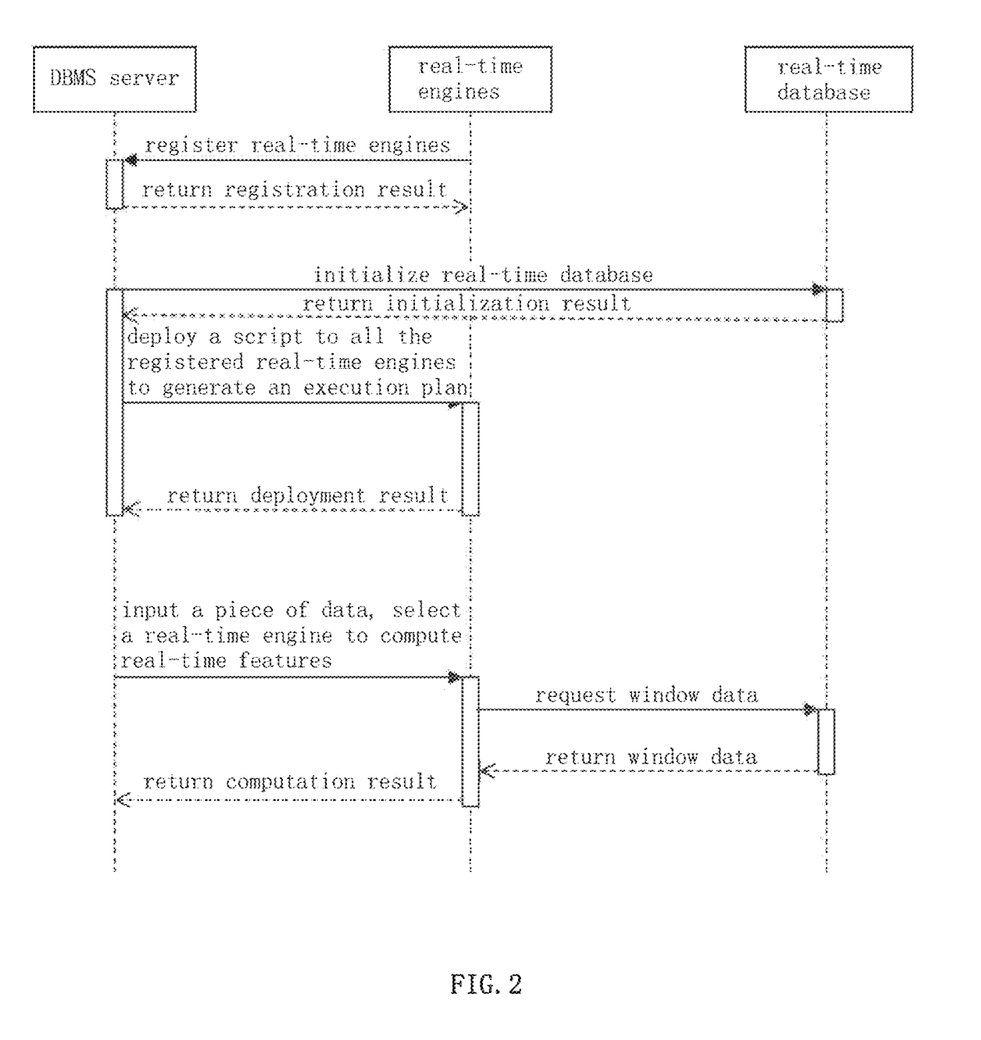
FIG. 2 illustrates a sequence diagram according to the exemplary embodiment of the present disclosure.

FIG. 2 illustrates a sequence diagram according to the exemplary embodiment of the present disclosure. As illustrated in FIG. 2, each real-time computing engine in the real-time computing engines (referred to as a real-time engine for short, multiple real-time engines may form a cluster) may be registered with a management server implemented as a DBMS server when it is started, and the management server feeds back the registration results to the real-time computing engines. The management server may further initialize the real-time database, the real-time database generates a data field structure corresponding to the real-time feature computation, and feeds back the data field structure corresponding to the real-time feature computation to the management server. The management server may also deploy the script to the registered real-time computing engines to generate a real-time computing plan, and the real-time computing engines may feed back the deployment results to the management server. The process of initializing the real-time database may be a part of the deployment process. During the deployment process, a deployment name may be generated, and deployment information such as the data field structure may be viewed and/or the real-time computing plan may be executed according to the deployment name.

In the present disclosure, during the deployment process, the deployment name may be generated, and the deployment information such as the data field structure may be viewed and/or the real-time computing plan may be executed according to the deployment name, and may also be expressed as: the following steps may be executed during the deployment process: generating the deployment name; at least one of viewing the deployment information such as the data field structure and executing the real-time computing plan, according to the deployment name.

As an example, the management server further transmits, when receiving at least one piece of data for the real-time feature computation and the real-time computing plan is executed, the at least one piece of data to the selected real-time feature computing unit, wherein the at least one piece of data conforms to the data field structure corresponding to the real-time feature computation, wherein the real-time feature computing unit requests window data from the real-time database when receiving the at least one piece of data, and performs the real-time feature computation based on the window data fed back by the real-time database and the script, wherein the window data includes all or a part of data fields of the data in the real-time database, and the window data includes the at least one piece of data and a specific amount of data associated with the at least one piece of data in characteristics such as time, etc. As an example, the window data is updated in real time according to window sliding; the window is used to process multi-line data in the real-time scenario, for example, in transaction information, taking the user card number as the dimension, a window with a time length of five days may be constructed, and a maximum data length in the window may be specified.

The real-time feature computing process is described below in conjunction with Table 1 to Table 4, and Table 1 illustrates personal transaction data according to an exemplary embodiment of the present disclosure. In Table 1, each column indicates one data field; name indicates a name, type is a character string; time indicates transaction time, and type is timestamp; price indicates transaction amount, and type is a double-precision floating-point type (double). Three rows of data illustrated in Table 1 may indicate three transaction records. The data in Table 1 corresponds to data table t1.

TABLE 1

| name:string | time:timestamp | price:double |
| --- | --- | --- |
| Wtz | 1556152031000 | 1.0 |
| Wtz | 1556065631000 | 2.0 |
| Wtz | 1555979231000 | 3.0 |

The following feature computing scripts may be input into the management server:

w=window(t1, "name", "time", 100, 10 d)

f=continuous(sum(w·price))

The first line of the script is used to construct windows, and the directed data table is table t1. The windows are aggregated by the name field and sorted by the time field. The maximum amount of data in a window is 100, and the maximum time span in a window is 10 days. The second line of the script is used to compute discrete features which are computed as a sum of the price field in the window.

FIG. 2 illustrates a data field structure according to an exemplary embodiment of the present disclosure. The data field structure (schema) illustrated in Table 2 may be generated in the real-time database, and the schema in the real-time database may be obtained by the management server.

TABLE 2

| Field Name | Field Type |
| --- | --- |
| name | string |
| time | timestamp |
| price | double |

The deployment name with respect to the above script may be dl. The script may be deployed to all registered real-time computing engines. If the fed-back deployment results do not include abnormal information, the deployment is successful. The real-time feature computation may be started subsequently.

During the real-time feature computation, at least one line of data conforming to schema may be input as sample data, and the window data may be obtained according to the sample data. It may start the real-time feature computation when the sample data and deployment name dl are input. Table 3 illustrates the sample data according to an exemplary embodiment of the present disclosure. The sample data illustrated in Table 3 includes one line of data, and the data conforms to schema.

TABLE 3

| name:string | time:timestamp | price:double |
| --- | --- | --- |
| Wtz | 1556238431000 | 4.0 |

The window data that is at the same window as the sample data may be obtained, and the real-time feature computation may be performed based on the obtained window data. Table 4 illustrates the window data according to an exemplary embodiment of the present disclosure, and the window data includes the sample data.

TABLE 4

| name:string | time:timestamp | price:double |
|---|---|---|
| Wtz | 1556152031000 | 1.0 |
| Wtz | 1556065631000 | 2.0 |
| Wtz | 1555979231000 | 3.0 |
| Wtz | 1556238431000 | 4.0 |

The computation logics for the real-time feature computation come from the script. The actually used script may include only the first line of the script or both the first and second lines of the script. Of course, when a large number of features are extracted, the number of lines of the input script may reach hundreds, thousands or even tens of thousands. In this case, since scripts respectively for the batch feature computing scenario and the real-time feature computing scenario are not required, the workload of script input is reduced, thereby feature computation efficiency may be improved.

Figure 3:
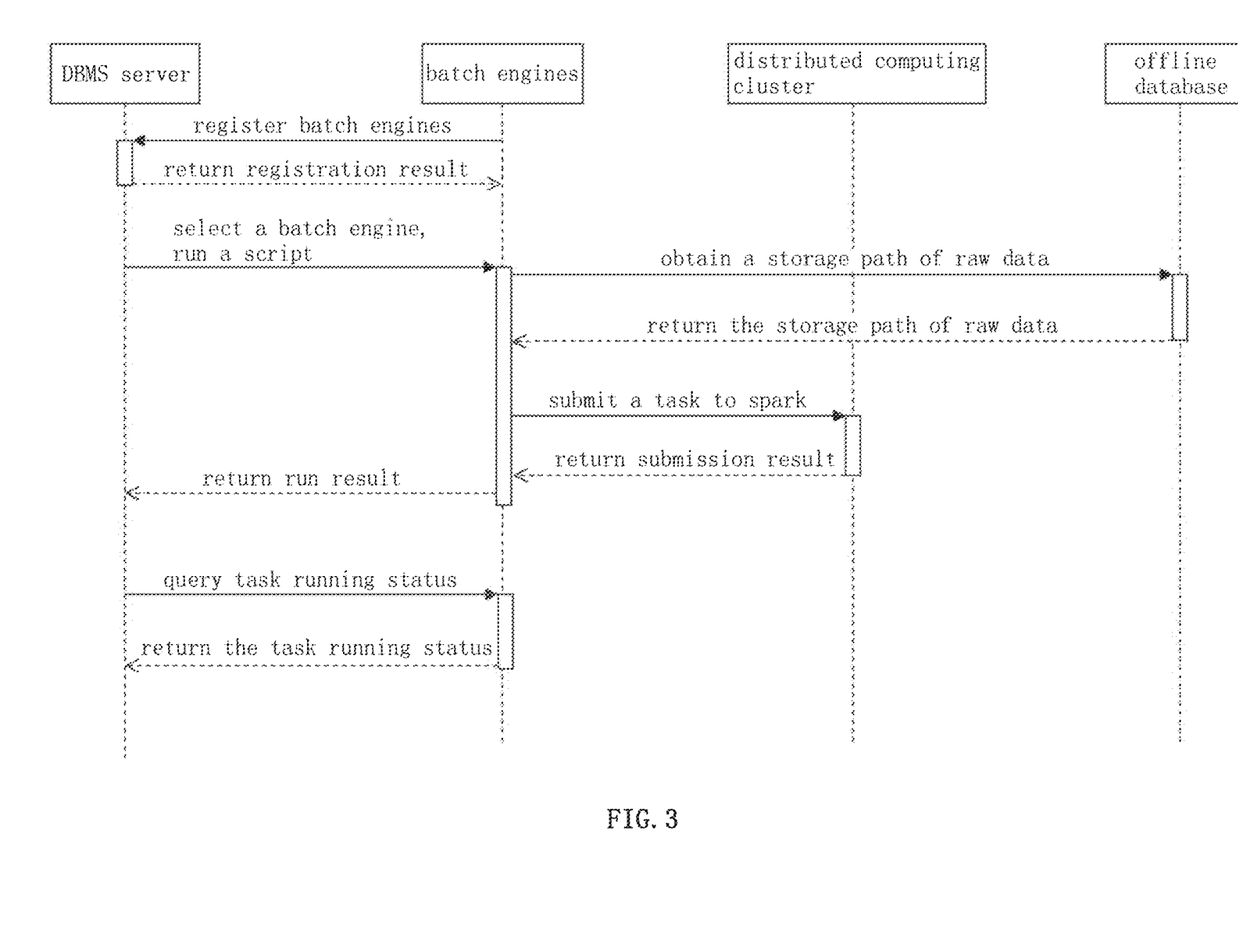
FIG. 3 illustrates a sequence diagram according to another exemplary embodiment of the present disclosure.

FIG. 3 illustrates a sequence diagram according to another exemplary embodiment of the present disclosure. As illustrated in FIG. 3, the batch feature computing units implemented as batch feature computing engines (batch engines for short) may be registered with the management server implemented as the DBMS server when they are started, and the management server feeds back the registration results to the batch engines. At least one batch engine among the plurality of registered batch engines may be selected according to load balancing and run the script. The batch engine may obtain the original data storage path from the offline database. The batch engine may submit computing tasks to distributed computing units implemented as a distributed computing cluster (Hadoop), and the distributed computing cluster feeds back the submitted results to the batch engines. Batch computing tasks may be performed by the distributed computing cluster to perform the batch feature computation based on the script and data stored in the offline database, wherein the data stored in the offline database may be obtained based on the original data storage path. The management server may query the batch engine for the batch feature computation execution status through a batch feature computation execution status query request. The batch feature computation execution status may be provided by the distributed computing cluster to the batch engine, and fed back to the management server by the batch engine.

As an example, the one or more distributed computing units obtain the data stored in the offline database based on a data storage path of the offline database, perform the batch feature computation based on the obtained data and the script, and transmit a batch feature computation execution status to the batch feature computing unit, wherein the management server obtains the batch feature computation execution status from the batch feature computing unit when receiving the batch feature computation execution status query request.

As an example, a computation result of the batch feature computation is used for model training or batch prediction, and a computation result of the real-time feature computation is used for prediction based on a trained model. In this case, exemplary embodiments of the present disclosure are applicable to both model training and online prediction based on the trained model.

As an example, when the script is run by the management server, the script is converted to be codes executable by the batch feature computing unit, the distributed computing unit and/or the real-time feature computing unit, and implementing, when executed, the feature computing logics contained in the script.

In the present disclosure, the above content may also be expressed as: when the script is run by the management server, the script is converted to be codes executable by at least one of the batch feature computing unit, the distributed computing unit and the real-time feature computing unit, and implementing, when executed, the feature computing logics contained in the script, or when the script is run, at least one of the batch feature computing unit, the distributed computing unit and the real-time feature computing unit parses out the feature computing logics contained in the script.

As an example, when the script is run, the batch feature computing unit, the distributed computing unit and/or the real-time feature computing unit parse out the feature computing logics contained in the script. In this case, the script has good compatibility.

In the present disclosure, the above content may also be expressed as: when the script is run, at least one of the batch feature computing unit, the distributed computing unit and the real-time feature computing unit parses out the feature computing logics contained in the script.

According to an exemplary embodiment of the present disclosure, the batch and real-time feature computation may be supported through a set of systems, the batch feature computing logics and the real-time feature computing logics are unified through a set of scripts, and the data in the offline database and the real-time database is associated (the data in the real-time database may be obtained from the offline database) or even synchronized, thereby solving the problems of inconsistence of the batch feature computing logics and the real-time feature computing logics and the separation of the offline database for batch feature processing and the real-time database for real-time feature processing in a machine learning scenario, to avoid inconsistency of the online data and the offline data. Limited machine resources may be used to implement machine learning in different scenarios, improve resource utilization, and task execution efficiency may further be improved through a unified script.

Figure 4:
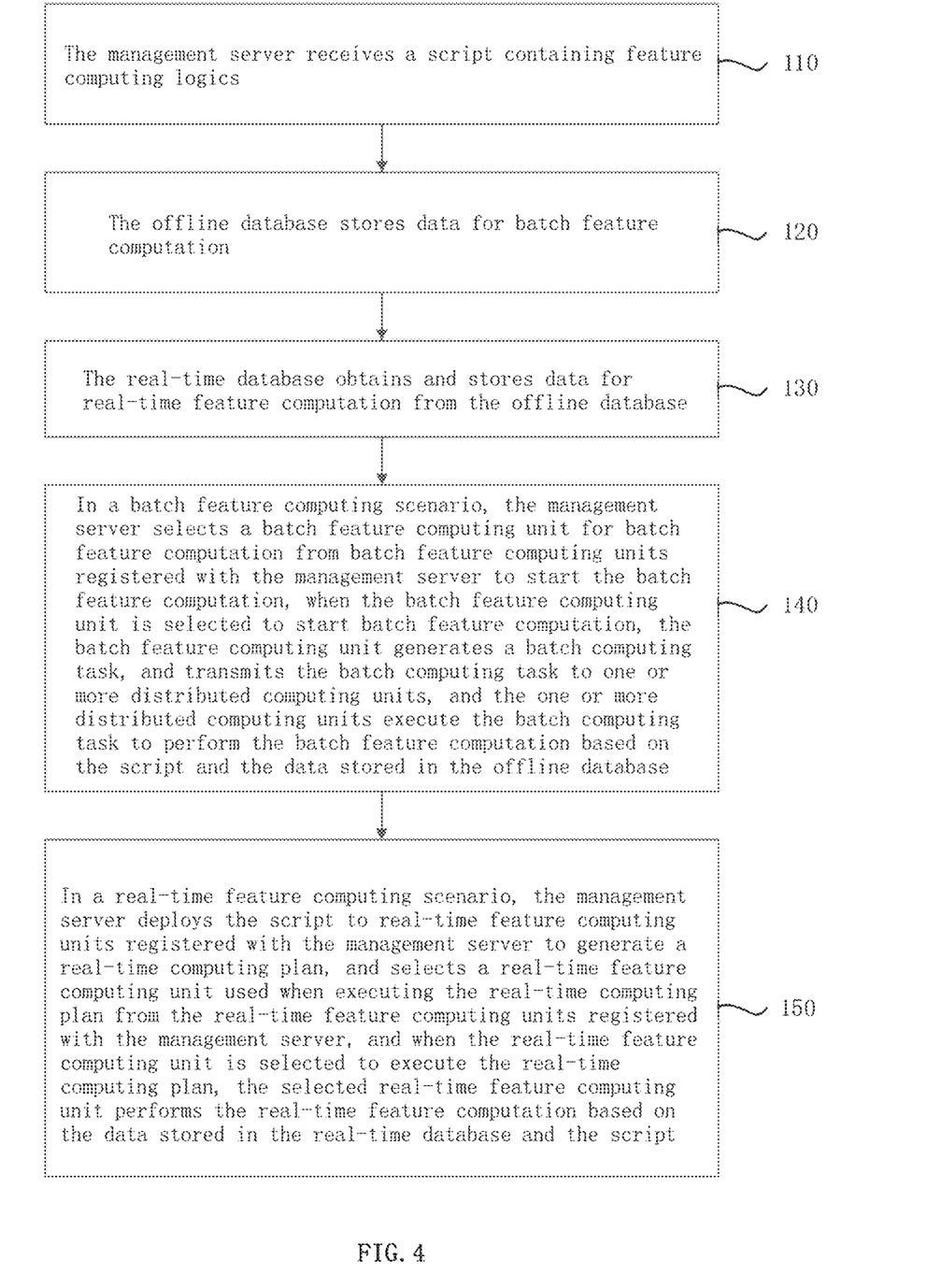
FIG. 4 illustrates a flowchart of a method for batch and real-time feature computation according to the exemplary embodiment of the present disclosure.

FIG. 4 illustrates a flowchart of a method for batch and real-time feature computation according to the exemplary embodiment of the present disclosure. As illustrated in FIG. 4, the method for batch and real-time feature computation according to an exemplary embodiment of the present disclosure may include step 110 to step 150. In step 110, the management server receives a script containing feature computing logics; in step 120, the offline database stores data for the batch feature computation; in step 130, the real-time database obtains and stores data for the real-time feature computation from the offline database; in step 140, in a batch feature computing scenario, the management server selects a batch feature computing unit for batch feature computation from batch feature computing units registered with a management server to start the batch feature computation, when the batch feature computing unit is selected to start batch feature computation, the batch feature computing unit generates a batch computing task, and transmits the batch computing task to one or more distributed computing units, and the one or more distributed computing units execute the batch computing task to perform the batch feature computation based on the script and the data stored in the offline database; and in step 150, in a real-time feature computing scenario, the management server deploys the script to real-time feature computing units registered with the management server to generate a real-time computing plan, and selects a real-time feature computing unit used when executing the real-time computing plan from the real-time feature computing units registered with the management server, and when the real-time feature computing unit is selected to execute the real-time computing plan, the selected real-time feature computing unit performs the real-time feature computation based on the data stored in the real-time database and the script, wherein the script containing the feature computing logics has unity batch feature computing logics and real-time feature computing logics.

A specific implementation manner of the management server executing the relevant steps in the method for batch and real-time feature computation is described below.

As an example, the management server includes at least one computing device and at least one storage device storing instructions, wherein the instructions, when being run by the at least one computing device, cause the at least one computing device to execute following steps of a method for batch and real-time feature computation:

receiving a script containing feature computing logics;

in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database; and in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script containing the feature computing logics has unity for batch feature computing logics and real-time feature computing logics, and the data stored in the offline database is data for the batch feature computation; and the data stored in the real-time database is data for the real-time feature computation obtained from the offline database.

As an example, the method may further include: the real-time database and the offline database perform data synchronization of at least a part of data based on data changes or based on a master-slave synchronization mechanism, periodically or in response to user triggering.

As an example, the method further includes that the management server initializes the real-time database to obtain a data field structure corresponding to the real-time feature computation.

As an example, the method may further include at least one of the following steps:

the management server receives raw data imported by a user and stores the raw data in the offline database as the data for the batch feature computation;

the management server uses at least a part of the data pre-stored in the offline database as the data for the batch feature computation.

As an example, the real-time database is a memory database.

As an example, the method may further include: the management server verifies whether there is a syntax error in the script, and/or debugs at least a part of intermediate running results and/or final running results corresponding to the script based on at least a part of the data.

In the present disclosure, the above content may also be expressed as, the method may further include at least one of the following steps:

the management server verifies whether there is a syntax error in the script;

debugs at least a part of intermediate running results corresponding to the script based on at least a part of the data; and debugs at least a part of final running results corresponding to the script based on at least a part of the data.

As an example, the method may further include: the management server transmits, when receiving at least one piece of data for the real-time feature computation and the real-time feature computing plan is executed, the at least one piece of data to the selected real-time feature computing unit, wherein the at least one piece of data conforms to the data field structure corresponding to the real-time feature computation; the real-time feature computing unit requests window data from the real-time database when receiving the at least one piece of data, and performs the real-time feature computation based on the window data and the script, wherein the window data includes all or a part of data fields of the data in the real-time database.

As an example, the step of performing batch feature computation includes: the one or more distributed computing units obtain the data stored in the offline database based on a data storage path of the offline database, perform the batch feature computation based on the obtained data and the script, and transmit a batch feature computation execution status to the batch feature computing unit, wherein the method further includes: the management server obtains the batch feature computation execution status from the batch feature computing unit when receiving a batch feature computation execution status query request.

As an example, a computation result of the batch feature computation is used for model training or batch prediction, and a computation result of the real-time feature computation is used for prediction based on a trained model, and the prediction includes online prediction.

As an example, the method may further include: when the script is run by the management server, the script is converted to be codes executable by the batch feature computing unit, the distributed computing unit and/or the real-time feature computing unit, and implementing, when executed, the feature computing logics contained in the script.

In the present disclosure, the above content may also be expressed as: when the script is run by the management server, the script is converted to be codes executable by at least one of the batch feature computing unit, the distributed computing unit and the real-time feature computing unit, and implementing, when executed, the feature computing logics contained in the script.

As an example, when the script is run, the batch feature computing unit, the distributed computing unit and/or the real-time feature computing unit parse out the feature computing logics contained in the script.

In the present disclosure, the above content may also be expressed as: when the script is run, at least one of the batch feature computing unit, the distributed computing unit and the real-time feature computing unit parses out the feature computing logics contained in the script.

The system and method of the present disclosure may simultaneously support the batch feature computation and the real-time feature computation based on the unified script and the two associated databases, and may resolve problems that the batch feature computing logics and the real-time feature computing logics are not unified in a machine learning scenario and the offline database of the batch feature processing and the real-time database of the real-time feature processing are separated.

In addition, the data in the offline database and the data in the real-time database are at least partially synchronized (for example, all the data or the changed data is periodically synchronized, or each database is updated according to an underlying log file, the underlying log file may record changes of the data in each database, and the two databases may have log files separately or share log files), thereby ensuring consistence of the data used in the online scenario and the offline scenario. Initializing the real-time database may generate a data field structure corresponding to the real-time feature computation in the real-time database and obtain the data field structure for reference of input data (for example, sample data) of the user, the user may input the at least one piece of data for real-time feature computation which conforms to the data field structure corresponding to the real-time feature computation according to the obtained data field structure even when the user does not understand the script; the local raw data of the user may be imported into the offline database for fast data input, and the existing data in the offline database may be used as the data for the batch feature computation to avoid repeated data import. At least one of determining whether there is a syntax error in the script, debugging intermediate running results and debugging final running results may be further executed to know correctness of the input script and the running results in time to avoid the processes such as running the wrong script, which affects the efficiency and accuracy of the feature computation. The window data obtained from the real-time database may include the at least one piece of data conforming to the data field structure corresponding to the real-time feature computation, the script may be used to configure information such as a field (for example, screening the fields) and window size etc. of the window data, and the window data is updated in real time according to the window sliding so as to ensure the real-time performance while ensuring the computation efficiency. The batch feature computation execution status may be obtained at any time during the process of the offline (batch) feature computation. The computation time of the batch feature computation is long, so the batch feature computation result may be used for offline training of a model or batch prediction; the computation time of the real-time feature computation is short, so that the real-time feature computation result may be suitable for prediction based on the trained model, especially online prediction. The script may be run by at least one of each unit and the server, and when run, the script may be converted or parsed to make the script executable, so that the script has good compatibility.

It should be understood that the specific implementation manner of the method for batch and real-time feature computation according to the exemplary embodiment of the present disclosure may be implemented with reference to the relevant specific implementation manners described in conjunction with FIG. 1 to FIG. 3, which will not be repeated here.

The units or servers included in the system for batch and real-time feature computation according to the exemplary embodiment of the present disclosure may be respectively configured as software, hardware, firmware or any combination thereof to perform specific functions. For example, these units or servers may correspond to dedicated integrated circuits, may also correspond to pure software codes, and may further correspond to modules combining software and hardware. In addition, one or more functions implemented by these units or servers may also be performed uniformly by components in a physical entity device (for example, a processor, a client or a server, etc.).

It should be understood that the method for batch and real-time feature computation according to the exemplary embodiment of the present disclosure may be implemented by a program recorded on a computer-readable medium, for example, according to an exemplary embodiment of the present disclosure, a computer-readable medium for batch and real-time feature computation may be provided. As an example, the provided computer-readable medium may be a plurality of computer-readable media which are respectively deployed in the management server, the offline database, the real-time database, the batch feature computing unit, the distributed computing unit and the real-time feature computing unit.

Wherein computer programs for performing the corresponding steps of the following method are recorded on each computer-readable medium: the management server receives a script containing feature computing logics; the offline database stores data for the batch feature computation; the real-time database obtains and stores data for the real-time feature computation from the offline database; in a batch feature computing scenario, the management server selects a batch feature computing unit for batch feature computation from batch feature computing units registered with a management server to start the batch feature computation, when the batch feature computing unit is selected to start batch feature computation, the batch feature computing unit generates a batch computing task, and transmits the batch computing task to one or more distributed computing units, and the one or more distributed computing units execute the batch computing task to perform the batch feature computation based on the script and data stored in an offline database; in a real-time feature computing scenario, the management server deploys the script to real-time feature computing units registered with the management server to generate a real-time computing plan, and selects a real-time feature computing unit used when executing the real-time computing plan from the real-time feature computing units registering with the management server, and when the real-time feature computing unit is selected to execute the real-time computing plan, the selected real-time feature computing unit performs the real-time feature computation based on data stored in a real-time database and the script, wherein the script containing the feature computing logics has unity batch feature computing logics and real-time feature computing logics.

The computer programs in the above computer-readable medium may run in an environment deployed in computer apparatuses such as a client, a host, a proxy device, a server, etc. It should be noted that the computer programs may also be used to execute additional steps in addition to the above steps or more specific processing is performed when the above steps are executed, and the contents of these additional steps and further processing have been described with reference to FIG. 1 to FIG. 3, and will not be repeated here in order to avoid repetition.

It should be noted that the system for batch and real-time feature computation according to the exemplary embodiment of the present disclosure may completely rely on the running of the computer program to implement the corresponding functions, that is, respective units or servers correspond to functional architectures of the computer program, so that the entire system is called through specialized software packages (for example, lib libraries) to implement corresponding functions.

On the other hand, the units or servers included in the system for batch and real-time feature computation according to the exemplary embodiment of the present disclosure may also be implemented by hardware, software, firmware, middleware, microcode or any combination thereof. Program codes or code segments for performing corresponding operations, when implemented in software, firmware, middleware or microcode, may be stored in a computer-readable medium such as a storage medium, so that a processor may perform the corresponding operation by reading and running the corresponding program codes or code segments.

For example, the exemplary embodiment of the present disclosure may also be implemented as a computing device, the computing device includes a storage component and a processor, the storage component has a set of computer-executable instructions stored therein, and when the set of computer-executable instructions is executed by the processor, a method for batch and real-time feature computation is executed.

It should be noted here that the computing device is different from the computing device in the above management server. Specifically, the computing device may execute the steps executed by any one of the above management server, offline database, real-time database, batch feature computing unit, distributed computing unit, and real-time feature computing unit, while the computing device in the above management server only executes the steps executed by the management server.

Specifically, the computing device may be deployed in a server or a client, and may also be deployed on a node device in a distributed network environment. In addition, the computing device may be a PC computer, a tablet device, a personal digital assistant, a smart phone, a web application or other devices capable of executing the above set of instructions.

Here, the computing device does not have to be a single computing device and may also be any device or a collection of circuits that may execute the foregoing instructions (or instruction sets) individually or jointly. The computing device may also be a part of an integrated control system or a system manager, or may be configured as a portable electronic device interconnected by an interface with a local or remote (for example, via wireless transmission).

In the computing device, the processor may include a central processing unit (CPU), a graphics processing unit (GPU), a programmable logic device, a dedicated processor system, a microcontroller, or a microprocessor. As an example and not limitation, the processor may also include an analog processor, a digital processor, a microprocessor, a multi-core processor, a processor array, a network processor, etc.

Some operations described in the method for batch and real-time feature computation according to the exemplary embodiment of the present disclosure may be implemented by a software manner, some operations may be implemented by a hardware manner, in addition, these operations may be implemented by a manner of combination of software and hardware.

The processor may run instructions or codes stored in one of storage components, wherein the storage component may also store data. Instructions and data may also be transmitted and received over a network via a network interface device, wherein the network interface device may use any known transmission protocol.

The storage component may be integrated with the processor as a whole, for example, RAM or a flash memory is arranged in an integrated circuit microprocessor or the like. In addition, the storage component may include an independent device, such as an external disk drive, a storage array, or any other storage device that may be used by a database system. The storage component and the processor may be operatively coupled, or may communicate with each other, for example, through an I/O port, a network connection, or the like, so that the processor may read files stored in the storage component.

In addition, the computing device may also include a video display (such as a liquid crystal display) and a user interaction interface (such as a keyboard, a mouse, a touch input device, etc.). All components of the computing device may be connected to each other via a bus and/or a network.

Operations involved in the method for batch and real-time feature computation according to the exemplary embodiment of the present disclosure may be described as various interconnected or coupled functional blocks or functional diagrams. However, these functional blocks or functional diagrams may be equally integrated into a single logical device or operate according to non-precise boundaries.

For example, as stated above, the computing device for batch and real-time feature computation according to the exemplary embodiment of the present disclosure may include a storage component and a processor, wherein the storage component has a set of computer-executable instructions stored therein, and when the set of computer-executable instructions is executed by the processor, the following steps are executed: the management server receives a script containing feature computing logics; the offline database stores data for the batch feature computation; the real-time database obtains and stores data for the real-time feature computation from the offline database; in a batch feature computing scenario, the management server selects a batch feature computing unit for batch feature computation from batch feature computing units registered with a management server to start the batch feature computation, when the batch feature computing unit is selected to start batch feature computation, the batch feature computing unit generates a batch computing task, and transmits the batch computing task to one or more distributed computing units, and the one or more distributed computing units execute the batch computing task to perform the batch feature computation based on the script and data stored in an offline database; in a real-time feature computing scenario, the management server deploys the script to real-time feature computing units registered with the management server to generate a real-time computing plan, and selects a real-time feature computing unit used when executing the real-time computing plan from the real-time feature computing units registered with the management server, and when the real-time feature computing unit is selected to execute the real-time computing plan, the selected real-time feature computing unit performs the real-time feature computation based on data stored in a real-time database and the script, wherein the script containing the feature computing logics has unity batch feature computing logics and real-time feature computing logics.

Various exemplary embodiments of the present disclosure have been described above, and it should be understood that the above descriptions are merely exemplary and not exhaustive, and the present disclosure is not limited to the disclosed various exemplary embodiments. To those ordinary skilled in the art, many modifications and variations are all obvious without departing from the principle and spirit of the present disclosure. Therefore, the protection cope of the present disclosure should be subject to the scope of the claims.

INDUSTRIAL APPLICABILITY

The system and method for batch and real-time feature computation provided by the present disclosure may simultaneously support the batch feature computation and the real-time feature computation based on a unified script and two associated databases, and may resolve problems that the batch feature computing logics and the real-time feature computing logics are not unified in a machine learning scenario and the offline database of the batch feature processing and the real-time database of the real-time feature processing are separated.

What is claimed is:

1. A method for batch and real-time feature computation, wherein the method comprises:
    receiving a script which unifies batch feature computing logics and real-time feature computing logics, wherein the batch feature computing is feature computation on batch data to obtain sample data for model training or batch prediction, and the real-time feature computing is feature computation on real-time data to obtain sample data for online prediction; and
    in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database, wherein the script is run by the management server to be converted to be codes implementing the batch feature computing logics and executable by at least one of the batch feature computing unit and the one or more distributed computing units, or
    in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script is run by the management server to be converted to be codes implementing the batch feature computing logics and executable by the real-time feature computing unit,
    wherein the data stored in the offline database is data for the batch feature computation, and the data stored in the real-time database is data for the real-time feature computation obtained from the offline database, and
    wherein the data in the offline database and the data in the real-time database are at least partially synchronized, and the real-time database and the offline database perform data synchronization based on data changes in the real-time database or the offline database or based on a master-slave synchronization mechanism periodically or in response to user triggering.

2. The method of claim 1, wherein the method further comprises at least one of following steps:
    initializing the real-time database to obtain a data field structure corresponding to the real-time feature computation; and
    receiving raw data imported by a user and storing the raw data in the offline database as the data for the batch feature computation, or using at least a part of the data pre-stored in the offline database as the data for the batch feature computation.

3. The method of claim 2, wherein the method further comprises:
    when at least one piece of data for the real-time feature computation is received and the real-time computing plan is executed, transmitting the at least one piece of data to the selected real-time feature computing unit such that the selected real-time feature computing unit requests window data from the real-time database when receiving the at least one piece of data, and performs the real-time feature computation based on the window data and the script,
    wherein the at least one piece of data conforms to the data field structure corresponding to the real-time feature computation, and the window data contains all or a part of data fields of the data of the real-time database.

4. The method of claim 1, wherein the real-time database is a memory database.

5. The method of claim 1, wherein the method further comprises at least one of following steps:
    verifying whether there is a syntax error in the script;
    debugging at least a part of intermediate running results corresponding to the script based on at least a part of the data; and
    debugging at least a part of final running results corresponding to the script based on at least a part of the data.

6. The method of claim 1, wherein the one or more distributed computing units obtain the data stored in the offline database based on a data storage path of the offline database, perform the batch feature computation based on the obtained data and the script, and transmit batch feature computation execution status to the batch feature computing unit; and
    wherein, the method further comprises: obtaining the batch feature computation execution status from the batch feature computing unit when receiving a batch feature computation execution status query request.

7. The method of claim 1, wherein when the script is run, at least one of the batch feature computing unit, the distributed computing unit and the real-time feature computing unit parses out the feature computing logics contained in the script.

8. A management server comprising at least one computing device and at least one storage device storing instructions, wherein the instructions, when being run by the at least one computing device, cause the at least one computing device to execute following steps of a method for batch and real-time feature computation:

receiving a script which unifies batch feature computing logics and real-time feature computing logics, wherein the batch feature computing is feature computation on batch data to obtain sample data for model training or batch prediction, and the real-time feature computing is feature computation on real-time data to obtain sample data for online prediction; and in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database, wherein the script is run by the management server to be converted to be codes implementing the batch feature computing logics and executable by at least one of the batch feature computing unit and the one or more distributed computing units, or in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script is run by the management server to be converted to be codes implementing the batch feature computing logics and executable by the real-time feature computing unit, wherein the data stored in the offline database is data for the batch feature computation, and the data stored in the real-time database is data for the real-time feature computation obtained from the offline database, and wherein the data in the offline database and the data in the real-time database are at least partially synchronized, and the real-time database and the offline database perform data synchronization based on data changes in the real-time database or the offline database or based on a master-slave synchronization mechanism periodically or in response to user triggering.

9. The management server of claim 8, wherein the instructions, when being run by the at least one computing device, cause the at least one computing device to execute at least one of following steps:

initializing the real-time database to obtain a data field structure corresponding to the real-time feature computation; and receiving raw data imported by a user and storing the raw data in the offline database as the data for the batch feature computation, or using at least a part of the data pre-stored in the offline database as the data for the batch feature computation.

10. The management server of claim 9, wherein the instructions, when being run by the at least one computing device, cause the at least one computing device to execute at least one of following steps:

when at least one piece of data for the real-time feature computation is received and the real-time computing plan is executed, transmitting the at least one piece of data to the selected real-time feature computing unit such that the selected real-time feature computing unit requests window data from the real-time database when receiving the at least one piece of data, and performs the real-time feature computation based on the window data and the script, wherein the at least one piece of data conforms to the data field structure corresponding to the real-time feature computation, and the window data contains all or a part of data fields of the data of the real-time database.

11. The management server of claim 8, wherein the instructions, when being run by the at least one computing device, cause the at least one computing device to execute at least one of following steps:

verifying whether there is a syntax error in the script;

debugging at least a part of intermediate running results corresponding to the script based on at least a part of the data; and debugging at least a part of final running results corresponding to the script based on at least a part of the data.

12. The management server of claim 8, wherein the one or more distributed computing units obtain the data stored in the offline database based on a data storage path of the offline database, perform the batch feature computation based on the obtained data and the script, and transmit a batch feature computation execution status to the batch feature computing unit; and wherein the instructions, when being run by the at least one computing device, cause the at least one computing device to execute a following step: obtaining the batch feature computation execution status from the batch feature computing unit when receiving a batch feature computation execution status query request.

13. The management server of claim 8, wherein when the script is run, at least one of the batch feature computing unit, the distributed computing unit and the real-time feature computing unit parses out the feature computing logics contained in the script.

14. A non-transitory computer readable storage medium storing instructions, wherein the instructions, when executed by at least one computing device, cause the at least one computing device to execute following steps of a method for batch and real-time feature computation:

receiving a script which unifies batch feature computing logics and real-time feature computing logics, wherein the batch feature computing is feature computation on batch data to obtain sample data for model training or batch prediction, and the real-time feature computing is feature computation on real-time data to obtain sample data for online prediction; and in a batch feature computing scenario, selecting a batch feature computing unit for batch feature computation from batch feature computing units registered with a management server to start the batch feature computation such that the selected batch feature computing unit generates a batch computing task, and transmitting the batch computing task to one or more distributed computing units such that the one or more distributed computing units execute the batch computing task to perform the batch feature computation based on the script and data stored in an offline database, wherein the script is run by the management server to be converted to be codes implementing the batch feature computing logics and executable by at least one of the batch feature computing unit and the one or more distributed computing units, or in a real-time feature computing scenario, deploying the script to real-time feature computing units registered with the management server to generate a real-time computing plan, and selecting a real-time feature computing unit used when executing the real-time computing plan from the real-time feature computing units registered with the management server such that the selected real-time feature computing unit performs the real-time feature computation based on data stored in a real-time database and the script, wherein the script is run by the management server to be converted to be codes implementing the batch feature computing logics and executable by the real-time feature computing unit, wherein the data stored in the offline database is data for the batch feature computation, and the data stored in the real-time database is data for the real-time feature computation obtained from the offline database, and wherein the data in the offline database and the data in the real-time database are at least partially synchronized, and the real-time database and the offline database perform data synchronization based on data changes in the real-time database or the offline database or based on a master-slave synchronization mechanism periodically or in response to user triggering.

\* \* \* \* \*